(12) United States Patent
Nalim (10) Patent No.: US 9,920,689 B2
(45) Date of Patent: Mar. 20, 2018

(54) HYBRID WAVE ROTOR PROPULSION SYSTEM

(71) Applicant: Indiana University Research and Technology Corporation, Indianapolis, IN (US)

(72) Inventor: M. Razi Nalim, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 600 days.

(21) Appl. No.: 14/211,140

(22) Filed: Mar. 14, 2014

(65) Prior Publication Data

US 2016/0194087 A1    Jul. 7, 2016

Related U.S. Application Data

(60) Provisional application No. 61/787,013, filed on Mar. 15, 2013.

(51) Int. Cl.
| | |
|---|---|
| *F02C 5/04* | (2006.01) |
| *F02C 3/02* | (2006.01) |
| *F02C 3/16* | (2006.01) |
| *F02C 5/11* | (2006.01) |

(52) U.S. Cl.
CPC .............. *F02C 5/11* (2013.01); *F02C 5/04* (2013.01); *F02C 3/02* (2013.01); *F02C 3/16* (2013.01); *Y02T 50/671* (2013.01); *Y10S 903/93* (2013.01)

(58) Field of Classification Search
CPC ............... F02C 3/02; F02C 3/16; F02C 5/04
USPC .......................................................... 60/39.45
See application file for complete search history.

(56) References Cited

U.S. PATENT DOCUMENTS

| | | | | |
|---|---|---|---|---|
| 5,894,719 A | * | 4/1999 | Nalim ................ | F02C 3/02 60/39.45 |
| 6,460,342 B1 | * | 10/2002 | Nalim ................ | F02C 3/02 60/39.45 |
| 6,526,936 B2 | * | 3/2003 | Nalim ................ | F02C 3/02 123/213 |
| 6,584,764 B2 | * | 7/2003 | Baker ................. | B64D 27/20 137/15.1 |
| 6,845,620 B2 | * | 1/2005 | Nalim ................ | F02C 3/02 60/39.45 |
| 8,400,005 B2 | * | 3/2013 | Huber ................ | F01D 15/10 290/52 |
| 8,443,583 B2 | * | 5/2013 | Nalim ................ | F02C 5/04 60/247 |

(Continued)

*Primary Examiner* — Justin Larson
(74) *Attorney, Agent, or Firm* — Faegre Baker Daniels LLP (57) ABSTRACT

A hybrid propulsion system includes a wave rotor combustion engine operating in parallel with an electrical motor-generator element. The motor-generator element is coupled to the turbine shaft to selectively drive or be driven by the turbine shaft. In one mode of operation, the motor of the motor generator element is powered by a battery to provide rotational energy to the turbine shaft. In another mode of operation, the wave rotor combustion engine drives the generator to recharge the battery. The wave rotor combustion engine may be further directly coupled to auxiliary components without a gearbox to drive the components at substantially the same speed as the turbine shaft. The turbine rotor of the combustion engine includes a plurality of chambers defined by circumferentially spaced curved vanes that improves specific fuel consumption for the engine.

19 Claims, 9 Drawing Sheets

(56) References Cited

U.S. PATENT DOCUMENTS

| | | | |
|---|---|---|---|
| 8,684,304 B2* | 4/2014 | Burns | B64D 27/00 244/57 |
| 8,893,467 B2* | 11/2014 | Nalim | F02C 5/04 60/247 |
| 2013/0327010 A1* | 12/2013 | Muller | F01D 1/32 60/39.01 |

* cited by examiner

HYBRID WAVE ROTOR PROPULSION SYSTEM

REFERENCE TO RELATED APPLICATION

This application is a utility fling of and claims priority to provisional application No. 61/787,013, filed on Mar. 15, 2013, the entire disclosure of which is incorporated herein by reference.

BACKGROUND

The present disclosure relates generally to an internal combustion wave rotor combustion engine, and to a hybrid system including the wave rotor engine.

Wave rotor combustion engines have been developed as an improvement to the conventional combustor that requires a separate high-pressure compressor and high-pressure turbine. In one example depicted in FIG. 1, a wave rotor is integrated into a propulsion system such as a gas turbine engine 10. The engine includes a fan 12 supplying air to a low pressure compressor 14. The compressor feeds compressed air into a chamber 16 where the air is mixed with fuel injected through nozzle 18. The combustible mixture is provided to a wave rotor assembly 20 that combusts the air-fuel mixture in a succession of substantially constant-volume combustion events. The resultant combusted gas is provided to the inlet of a low-pressure turbine 22 which extracts power to drive the fan 12, compressor 14 and other accessories. The combusted mixture exits the turbine into a convergent nozzle 24 to form a high-velocity jet of hot gas.

Figure 1:
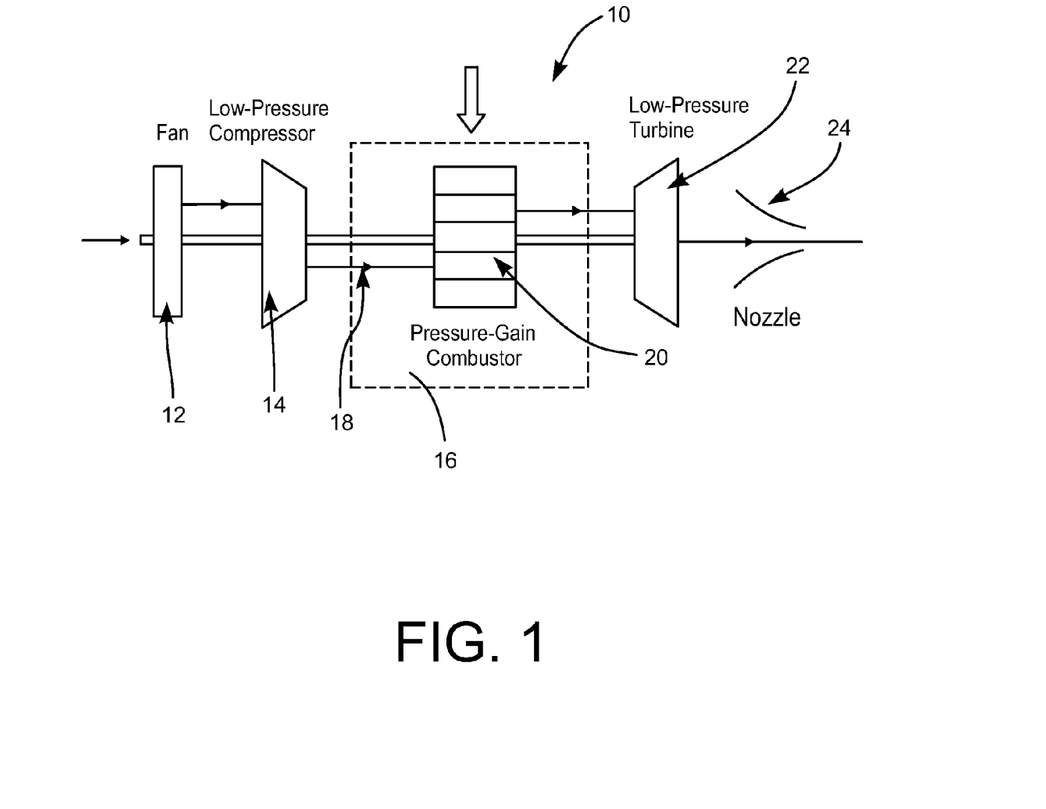
FIG. 1 is a schematic representation of a jet engine incorporating a wave rotor assembly.
Figure 2:
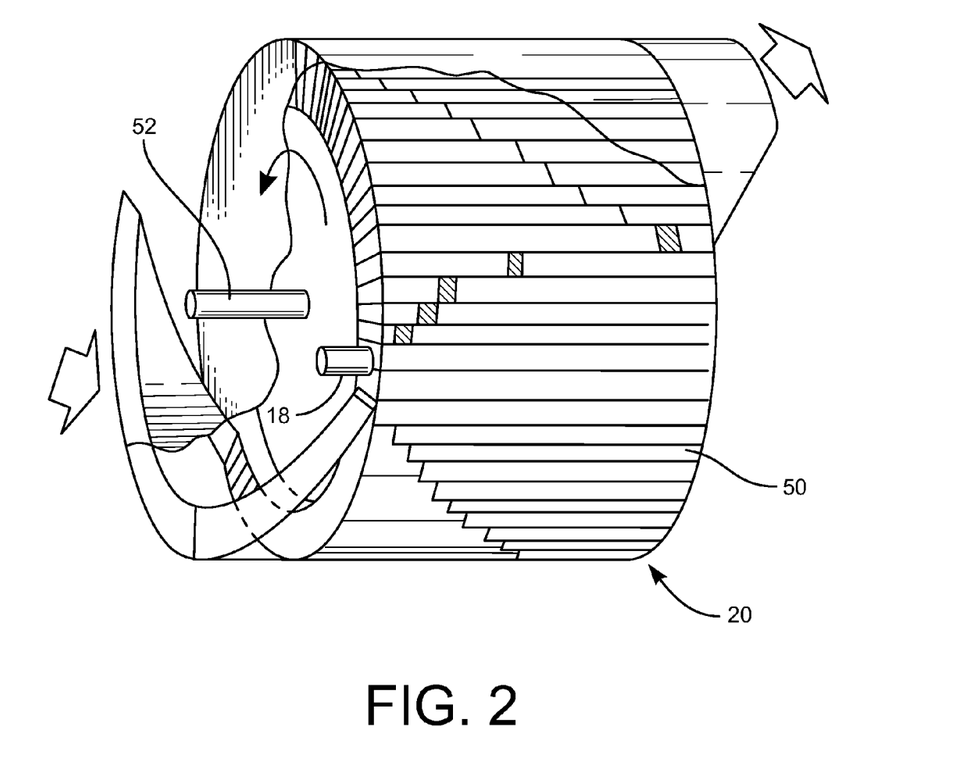
FIG. 2 is a perspective view of the wave rotor assembly incorporated into the engine of FIG. 1.
Figure 3:
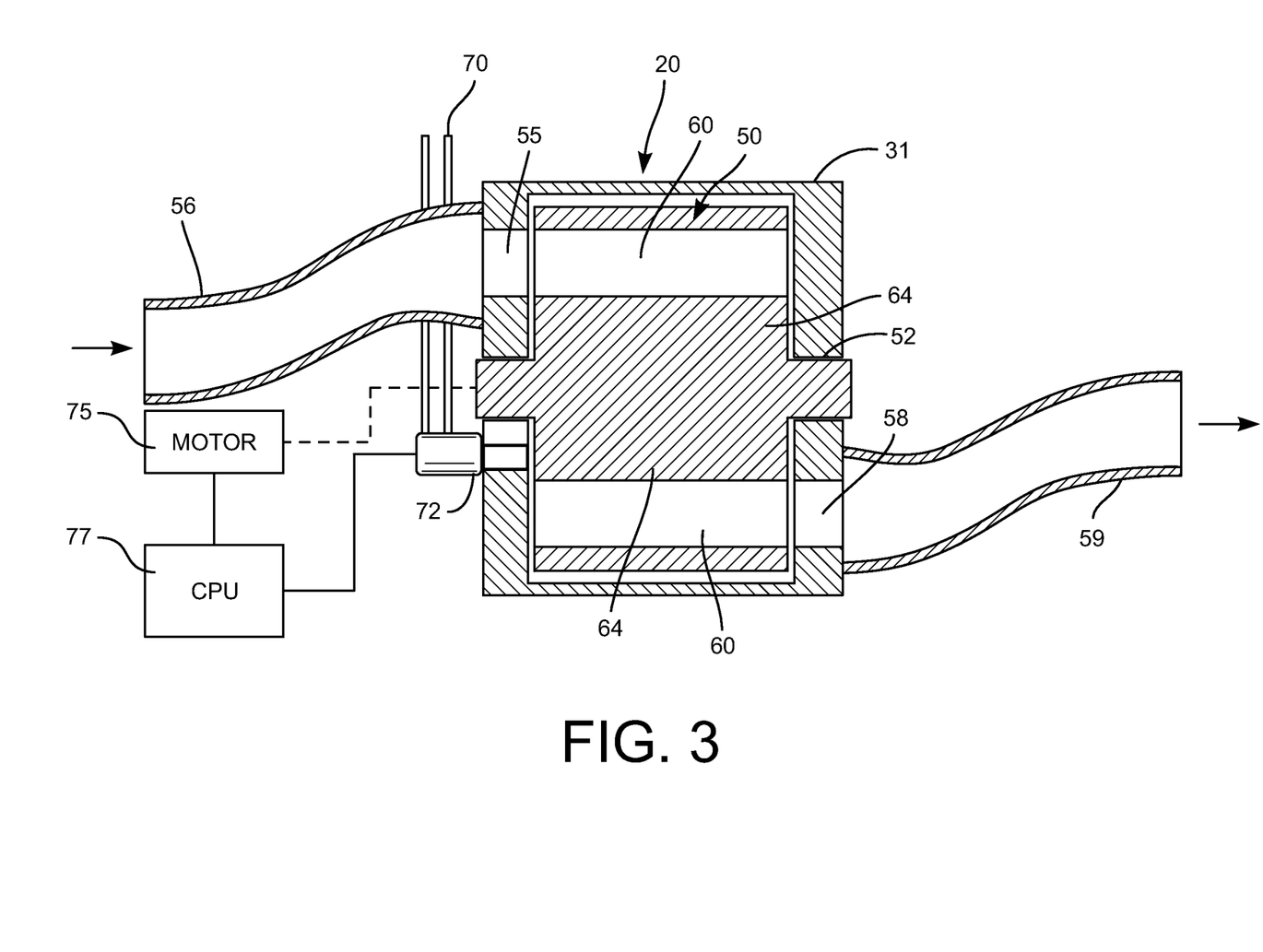
FIG. 3 is a side cutaway representation of the wave rotor assembly shown in FIG. 2.
Figure 4:
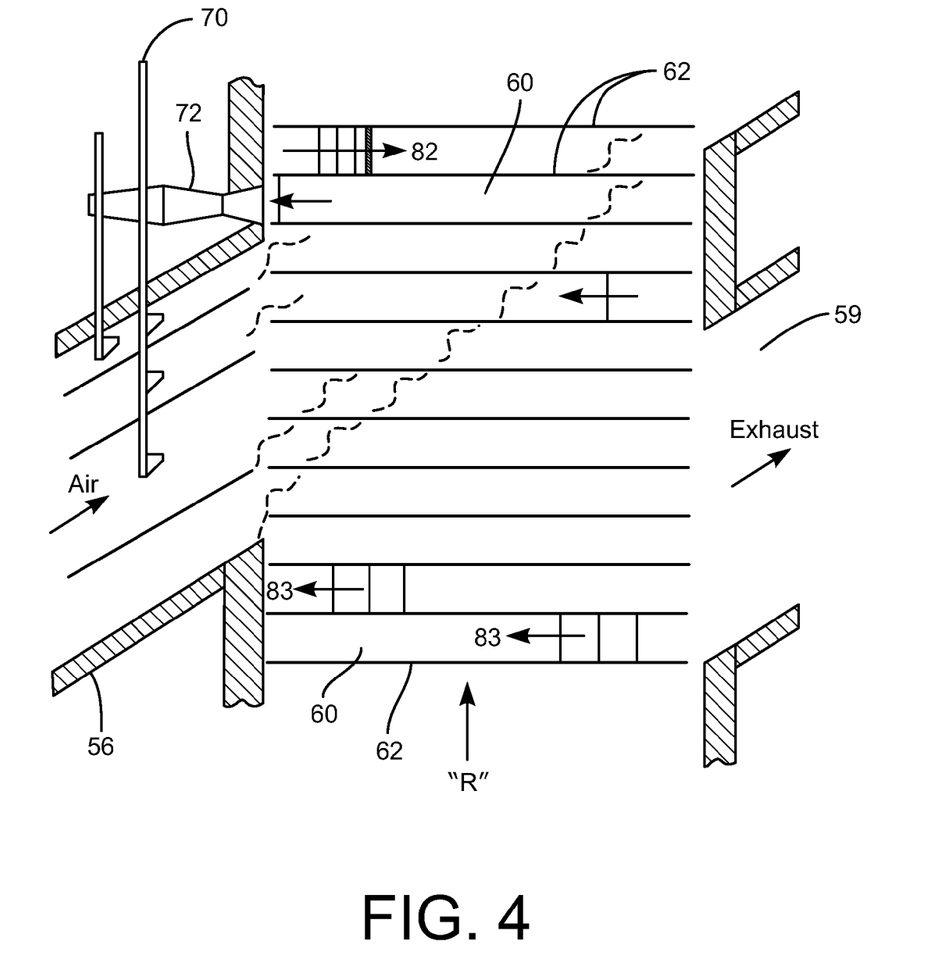
FIG. 4 is a circumferentially expanded view of the interior of the wave rotor assembly of FIGS. 2-3.

One example of such a wave rotor assembly suitable for use in the engine 10 of FIG. 1 is disclosed in U.S. Pat. No. 6,460,342. The construction of one form of wave rotor assembly is generally depicted in FIGS. 2-4, with further details provided in the '342 Patent, the disclosure of which is incorporated herein by reference. As shown in FIG. 2, the wave rotor assembly 20 includes a rotor 50 with a rotor shaft 52 mounted for rotation within a housing 54. The housing defines an inlet port 55 for receiving compressed air and/or an air-fuel mixture through an inlet duct 56 (coupled to the compressor 14), and an outlet port 58 supplying combusted gas to an outlet duct 59 (coupled to the turbine 22). The rotor 50 includes a plurality of chambers 60 formed by vanes 62 extending radially from the hub 64 of the rotor and axially along the rotor from the inlet to the outlet. Fuel is injected into the inlet air stream by a feed line 70. An igniter 72 ignites the air-fuel mixture within the rotor 50. A motor 75 may be connected to the rotor shaft 52 to rotate the rotor 50. A controller 77 controls the motor, fuel injectors and igniter to control the timing of the detonative process within each of the chambers 60.

In operation, a deflagration flame or detonation wave 82 produced by ignition of the air-fuel mixture within a particular chamber results in substantially constant volume combustion. The hot gas generated by combustion exits into the outlet port 58, resulting in an expansion wave 83 which travels from the outlet end to the inlet end of a combustion chamber just as it rotates into communication with the inlet port 55. The resulting reduction of pressure draws new air into the chamber. The rotor continues to rotate through various inlet zones to receive a new charge of combustible air-fuel mixture and an oxidant until the chamber is in line with the igniter 72, whereupon ignition of the air-fuel mixture starts the cycle over again. The foregoing is a general description of the operation of the wave rotor assembly 20, it being understood that more details of the operation can be obtained from the '342 Patent incorporated herein by reference.

Aircraft electrification could cut operating fuel cost and environmental impact if a very efficient and powerful combustion engine can be provided that complements an energy-dense battery storage and a lightweight motor. Piston or rotary engines may be too heavy, and gas turbine engines too thirsty, but their best attributes unite in the wave rotor combustion (WRC) turbine engine described above. Beyond constant-volume combustion (CVC) thermodynamics, the WRC turbine merges compressor, combustor, and turbine functions into a single rotating component. Recent progress in fast deflagration, wave rotors, and high-density batteries enables the "hybrid wave-rotor electric aero-propulsion" (HyWREAP) technology to achieve quantum performance gains.

Conventional Brayton-cycle continuous-flow combustors allow free expansion which wastes energy. Ubiquitous in Nature, oscillatory and pulsatile flows are rarely exploited by human engineers. CVC offers high specific impulse and power over a wide Mach range with limited or no mechanical compression. For 737-class aircraft in the NASA-designated 'N+3' time frame, CVC was top-ranked by Boeing's Subsonic Ultra Green Aircraft Research (SUGAR) study for both fuel burn and landing/take-off (LTO) NOx. The SUGAR study also predicted up to 65% fuel cuts for hybrid-electric-gas turbine drive.

On the electrical side of the equation, the rapid pace of innovations for battery energy density and electric machines creates the potential for these technologies and the CVS technology to be highly synergistic. The present disclosure goes beyond ideas that consider pure electric propulsion or hybrid electric propulsion where a conventional gas turbine powers distributed propulsor fans. HyWREAP as described herein is an integrated and optimal approach to combining on-board energy sources of battery power and hydrocarbon fuel. For most transport aircraft with the relatively predictable duty cycle, the on-board batteries would not need to be recharged in flight even in the hybrid case that includes a combustion engine producing power. Rather, their state of charge would be carefully managed such that the airplane will use up all the battery power during intended parts of the duty cycle, whether taxiing, takeoff assist, portions of cruise, or landing. For some flight applications with less predictable or highly varying duty cycle, such as unmanned aircraft, the on-board batteries would be charged from the combustion engine power source, so as to maintain readiness for periods of high power or silent operation or power needs other than propulsion, such as data transmission or sensors.

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 5:
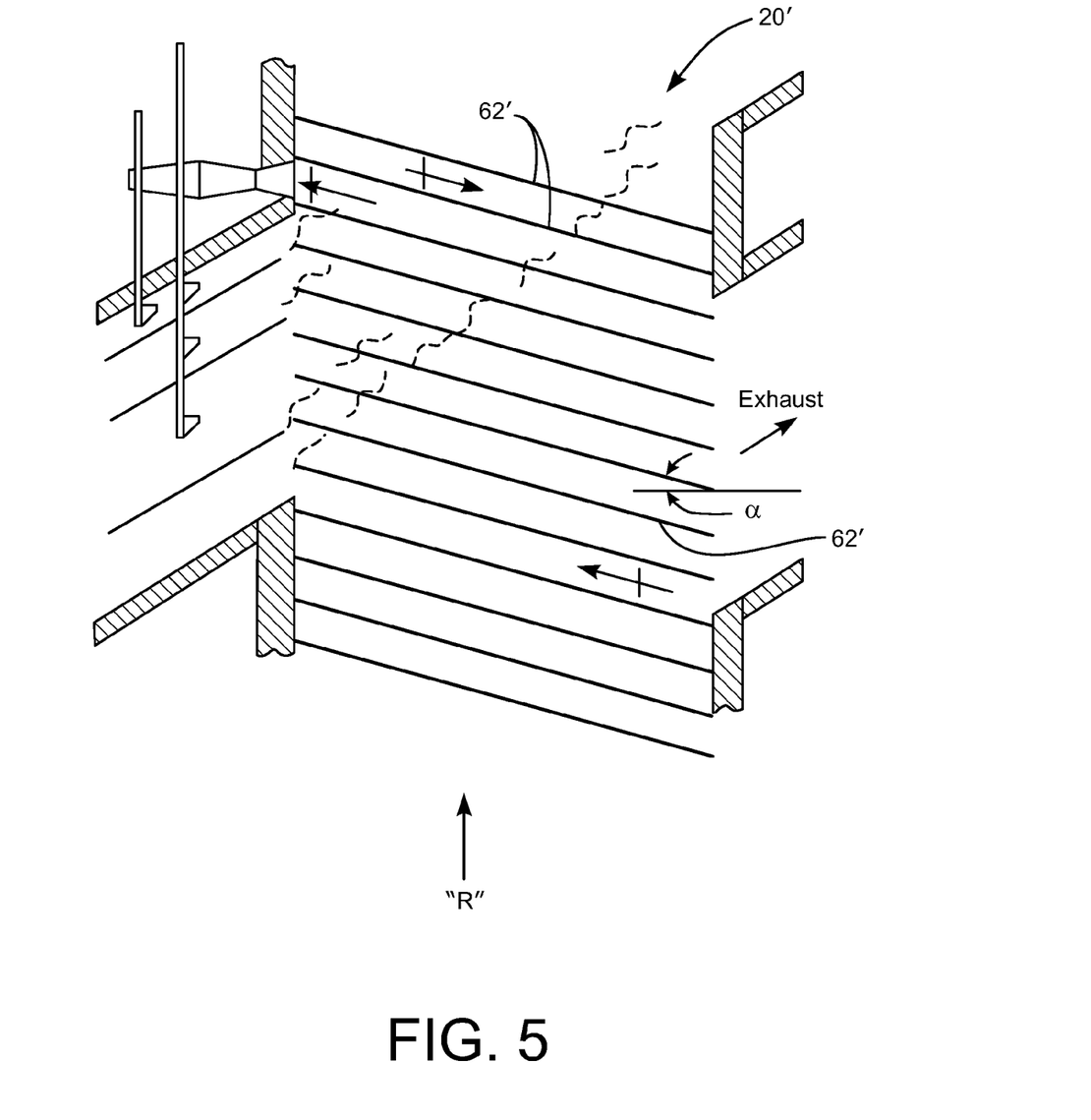
FIG. 5 is a circumferentially expanded view of the interior of a wave rotor assembly incorporating straight blades according to one disclosed embodiment.

In the engine 10 shown in FIG. 1, the wave rotor assembly 20 is used as a pressure gain combustor rather than as a direct power supply. In other words, the conventional wave rotor represented by FIG. 1 is configured for high pressure exhaust that is supplied to drive a turbine of the power plant 10. The wave rotor assembly in the engine 10 is in turn rotated by a low pressure turbine 22, and/or by the motor 75 (FIG. 3). The conventional wave rotor may be modified to incorporate a turbine function by orienting the vanes 62 at an angle to the axis of the rotor so that the combustion wave and expansion wave produce a net circumferential force to rotate the wave rotor. The result is rotation of the rotor shaft 52 at a much lower rotational speed than the conventional turbine engine shown in FIG. 1. Thus, as shown in FIG. 5, a wave rotor assembly 20' can incorporate slanted vanes 62' that are oriented at an angle α relative to the longitudinal axis of the wave rotor. The angle α can be adjusted to control the rotational speed of the rotor shaft. For example, the angle α may be in the range of 20-30 degrees.

Figure 6:
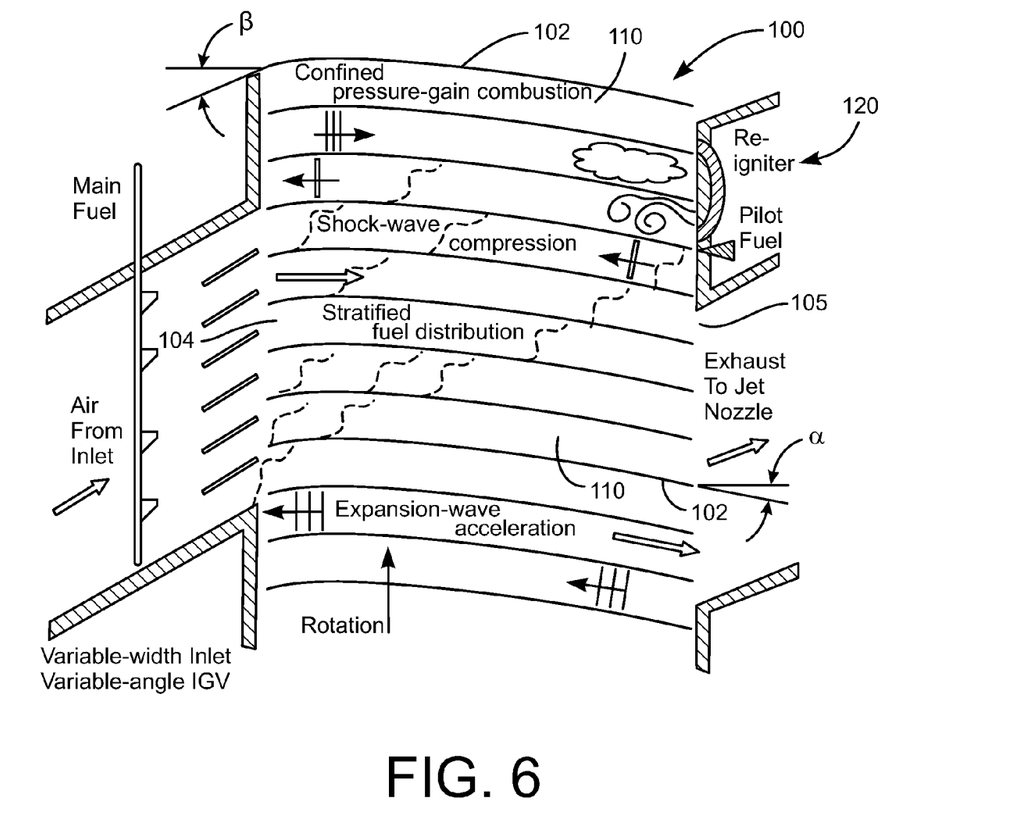
FIG. 6 is a circumferentially expanded view of the interior of a wave rotor assembly incorporating curved blades according to a further disclosed embodiment.

The vanes 62' of the modified wave rotor assembly 20' are straight so that the pressure-gain aspect is dominant. For a hybrid powerplant, as described in more detail herein, a more optimum ratio of high pressure gas generation and rotational speed is desirable. Thus, in a further embodiment, the vanes of the wave rotor may be curved, as depicted in FIG. 6. In this embodiment, a wave rotor assembly 100 is constructed like the assembly 20 or 20' except that the vanes 102 are curved along the axial length of the rotor. The vanes 102 have an inlet angle β at the inlet end 104 and an outlet angle γ at the outlet end 105 of the wave rotor. The magnitude of the two angles and the difference between the angles β and γ can be adjusted to control the rotational speed of the rotor shaft, and hence the output speed of the engine incorporating the wave rotor assembly 100. It is understood that the increase in rotational speed is a trade-off with the pressure generation function. For the hybrid powerplant disclosed herein, an optimum ratio of high pressure generation to rotational speed can depend upon the application to which the hybrid powerplant is applied. The optimum angles and rotational speed may also depend on the minimization of aerodynamic losses encountered and the limitations on structural stresses and thermal loads within the wave rotor.

The curvature or axial shape of the vanes 102 between the inlet 104 and outlet 105 can be configured for optimum pressure distribution across the length of the chambers 110 defined by the vanes. In one embodiment, the vanes are parabolic with a greater curvature adjacent the inlet 104 and a more shallow curvature at the outlet 105. In one specific configuration, the inlet angle β is in the range of +20 to +30 degrees and outlet angle γ is in the range of −20 to −30 degrees. In another specific configuration the inlet angle β is in the range of +10 to −30 degrees and outlet angle γ is in the range of −0 to −60 degrees.

The wave rotor assembly 100 of FIG. 6 provides significant advantages over the traditional turbine engine 10. The wave rotor assembly 100 merges compressor, combustor and turbine functions within a single pressure casing and achieves shock compression, fast deflagration and gas expansion within multiple chambers without suffering from flow instabilities. The wave rotor assembly 100 is structurally and functionally similar to the engine 20 in that it includes several combustion chambers arranged circumferentially on a cylindrical drum that rotates between two stationary end plates (FIG. 3). Each chamber is periodically charged and discharged as it rotates past properly sized and clocked inlet and outlet ports. When recharged with combustible mixture and closed, combustion is initiated and completed within the chamber. To initiate combustion within the chamber a torch igniter or re-injected hot combusted gas can be used. Mechanical confinement of combustion gas in a constant-volume chamber allows relatively uniform pressure rise by deflagrative combustion, although other modes of combustion, such as detonation, are also possible in the WRC engine.

The gas dynamic processes and flow features occurring inside each wave rotor chamber are illustrated in FIG. 6. Pressure waves (both compression and expansion waves) are generated when the chamber opens and closes periodically during rotation. The rotor cycle of each chamber includes filling of air-fuel mixture, initiation and completion of combustion, and utilization of the energy by discharge of pressurized and accelerated gas. Following each combustion event in a representative chamber, starting from the bottom of the figure, high-pressure gases are expelled from the right end of the chamber by opening the exhaust port, creating an expansion wave that travels back to the left, and generating a reactive torque through the curved blades 102 to generate power from the rotor shaft. As pressure falls to a determined level, the chamber is exposed to the inlet port, bringing in combustible mixture at the left end of the chamber. While the filling process continues, the scavenging of gas through the exit port is stopped by closing the exhaust port, generating a compressive wave that provides thermodynamic benefit. Any residual gas and fresh air-fuel mixture trapped in the chamber are compressed by this shock wave, which propagates backward toward the inlet end wall. With both ends of the chamber closed, the combustion is initiated by an ignition source, such as the re-igniter 120 augmented by pilot fuel. The re-ignition and pilot fuel injection feature is described in commonly-owned U.S. Pat. No. 8,443,583, issued on May 21, 2013, the entire disclosure of which is incorporated herein by reference. The confined combustion process greatly increases the pressure and temperature in the chamber, and another operating cycle starts. Every chamber undergoes exactly the same cycle in phase with its angular location, providing steady flow at any port location. These features of the cycle results in self-cooling of the rotor, steady and relatively uniform inflow and outflow, significant pressure gain and reaction torque, and overall temperature ratio that is compatible with the gas turbine engine requirements.

Figure 7:
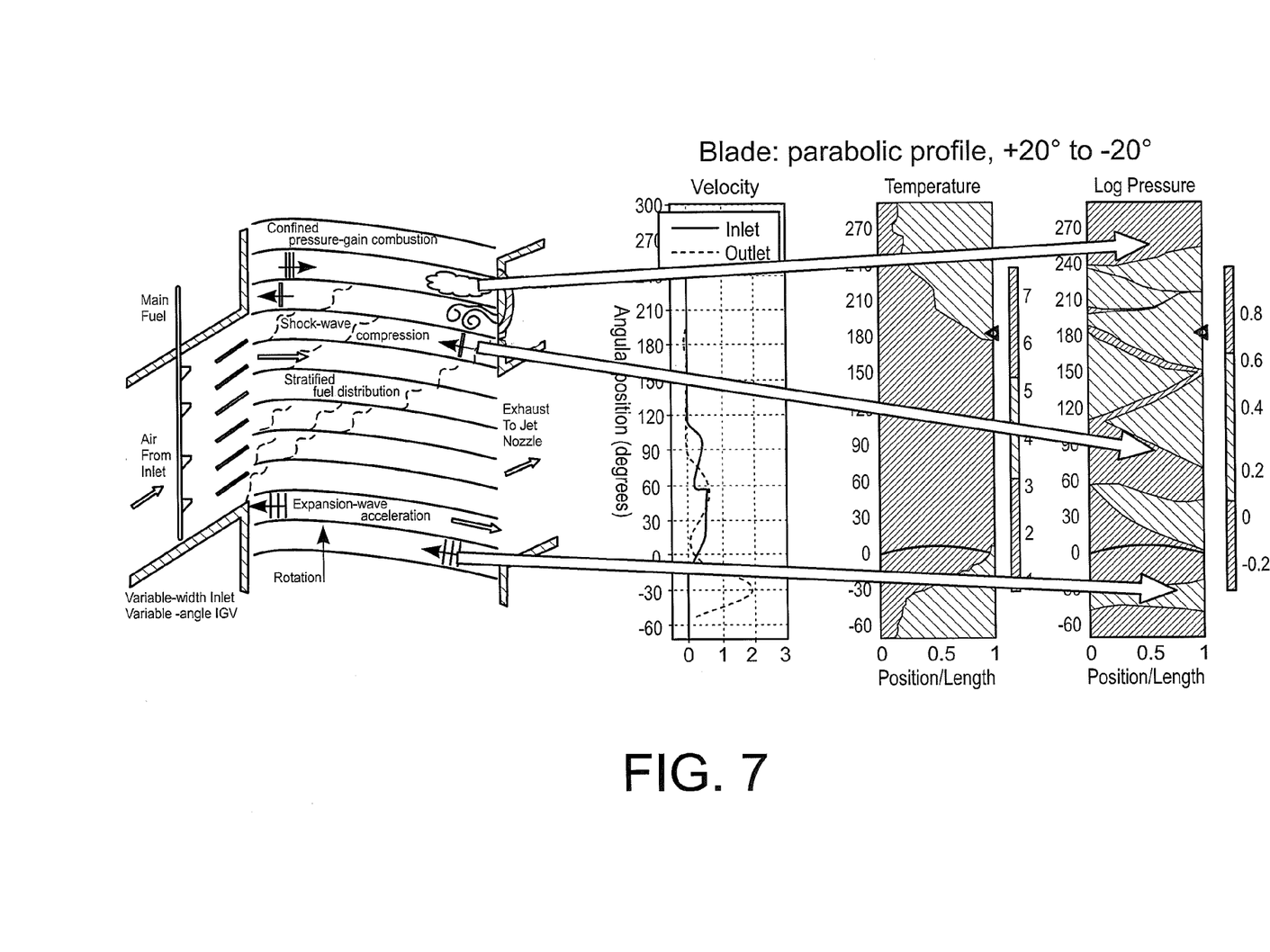
FIG. 7 is a graph of curved vane wave rotor performance for a parabolic blade having ±30 degree inlet/outlet.

The wave rotor assembly 100 combines heat release and work output so that specific work is greatly increased for a given turbine inlet temperature. Predicted performance for a ±20 degree curved vane is shown in FIG. 7. In particular, the velocity, temperature and log pressure at different angular locations within the rotor are reflected in the three graphs.

Figure 8:
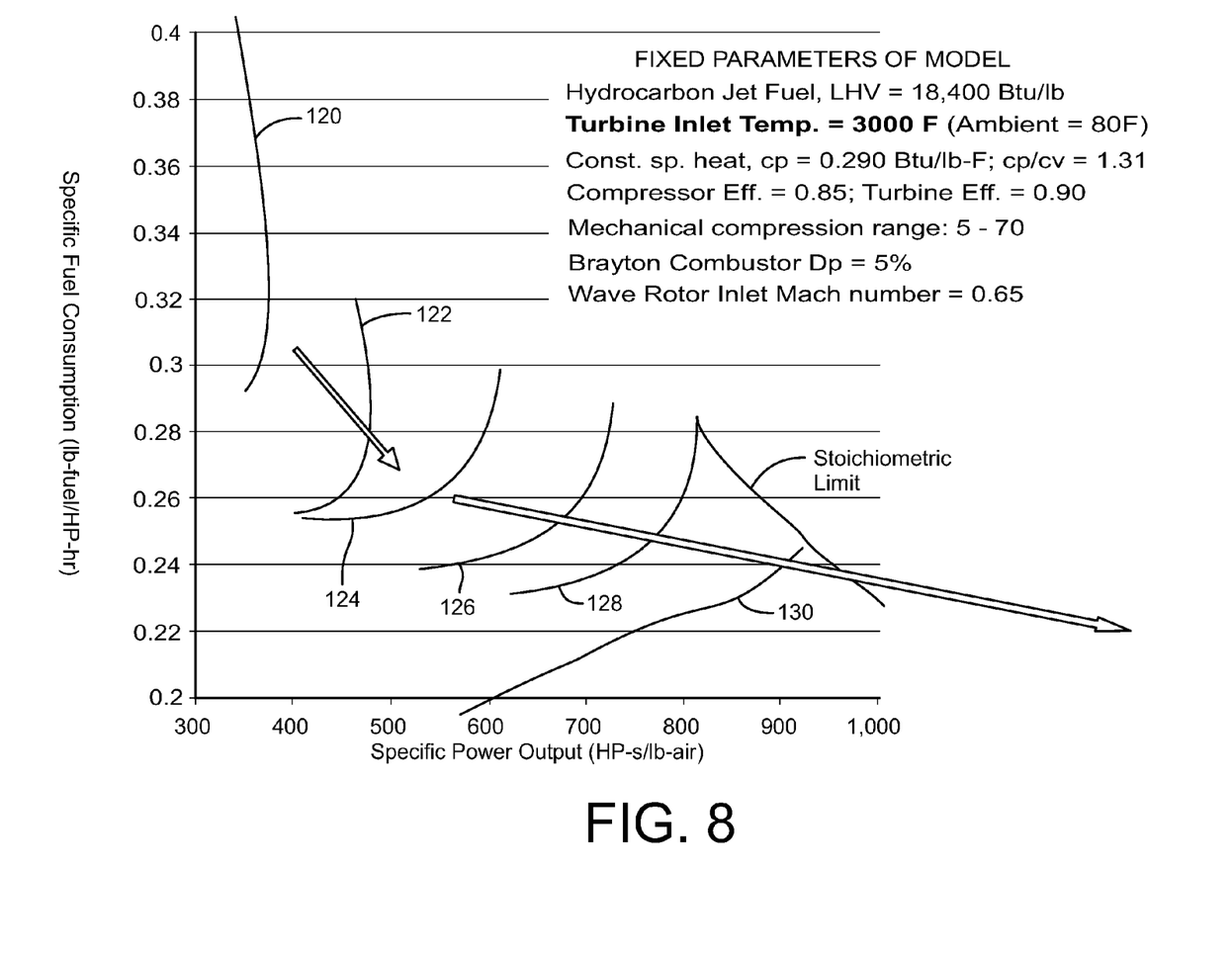
FIG. 8 is a graph of specific power output relative to fuel consumption for different forms of engines.

These attributes of the curved vane wave rotor assembly result in dramatic improvements in fuel consumption, as reflected in the graph of FIG. 8. In this graph, line 120 represents a model of the performance of a conventional Brayton cycle gas turbine engine, which corresponds well to known data for such engines. The line 122 corresponds to the predicted performance of a conventional wave rotor assembly, such as the assembly 20. As the graph reflects, use of the prior wave rotor assembly 20 results in significant reductions in specific fuel consumption and a modest increase in specific power output. Even greater predicted reductions in fuel consumption and predicted increases in power output can be achieved with the wave rotor assembly 100 incorporating curved vanes. The curves 126-130 represent wave rotor assembly performance at different inlet angles β and outlet angle γ, which are characterized in terms of the pressure gain achieved by the modified wave rotor. Thus, curve 124 corresponds to a pressure gain (PG) of 1.5, curve 126 to a PG of 1.0, curve 128 to a PG of 0.75 and curve 130 to a pressure gain of 0.5. (It can be appreciated that the pressure gains for the conventional engine and the straight blade wave rotor engine will vary above 2.0). The inlet-outlet angles were increased from approximately ±20 degrees at curve 124 to approximately ±30 degrees at curve 130. As seen by comparing the conventional engine curve 120 with the curve 130 the approximately ±30 degrees curved vane wave rotor assembly provides a very significant increase in specific power output coupled with a significant decrease in specific fuel consumption.

In particular, WRC technology can accomplish CVC in an efficiently flowing, mechanically elegant, and tightly integrated component. WRC suffers no flow instabilities, and shock-accelerated flame propagation is highly compatible with fast hydrogen kinetics, thus being synergistic with the use of hydrogen simultaneously as a fuel and as a coolant for electrical systems. Following earlier work with NASA on more primitive pressure-exchanger designs, self-sustaining re-ignition and fast propagating deflagration was demonstrated in a self-cooled experimental WRC rig. This straight-channel ambient-pressure WRC operated for short times as predicted. Scalable ignition and combustion physics, thermal management, and long-life sealing are being addressed.

In addition to shock compression, fast deflagration, and gas expansion in multiple chambers within one pressure casing, a WRC turbine achieves shaft torque and work output by using curved chambers 110 defined by curved blades 102. Because the WRC turbine combines heat release and work output, specific work is greatly increased for a given turbine inlet temperature. As the WRC turbine approaches stoichiometric operation, high-pressure turbines could be eliminated, circumventing their temperature limits. The low-rpm WRC turbine and electric motors will drive fan propulsors, with optimally greater WRC turbine role for higher flight speeds and longer-range flights. For subsonic transport, an electric-drive HP compressor could boost pressure. Battery state-of-charge would be matched to remaining fuel to ensure range capability.

The wave rotor assemblies 20' and 100 described above provide a further benefit by way of the much lower rotational speed relative to the conventional turbine engine 10. Depending upon its application, a conventional turbine's output power turbine operates at speeds in the range of 10,000 for large jet engines to 30,000 rpm for smaller powerplants. The conventional engine is well suited for jet propulsion but requires a gearbox to reduce the turbine rotational speed to a usable speed to drive other components. For instance, a turbo-prop propulsion system or a helicopter propulsion system requires a gearbox to step down the output speed of the engine. Likewise, non-propulsion applications such as heavy-duty generator sets require a gearbox to reduce the output speed. The gearbox adds to the complexity of the power or propulsion system as more rotating parts are introduced. Moreover, the gearbox adds significant weight to the system, which is particularly detrimental to an air vehicle since it increases power needs and reduces fuel economy.

The wave rotor assemblies disclosed herein, and particularly the assembly 100, provides a relatively low speed output at the rotor shaft. For certain vane configurations in commonly used engine size class, the wave rotor assembly can have an output speed in the range 3000-8000 rpm, which is suitable for directly powering heavy-duty generators without the need for a reducing gearbox. Even for applications that require further speed reduction, such as for powering a helicopter rotor, a much smaller gearbox can be used which still leads to a weight reduction of the powerplant. The wave rotor assemblies described herein thus allow the powerplant or engine to be matched to the particular needs of the application.

Figure 9:
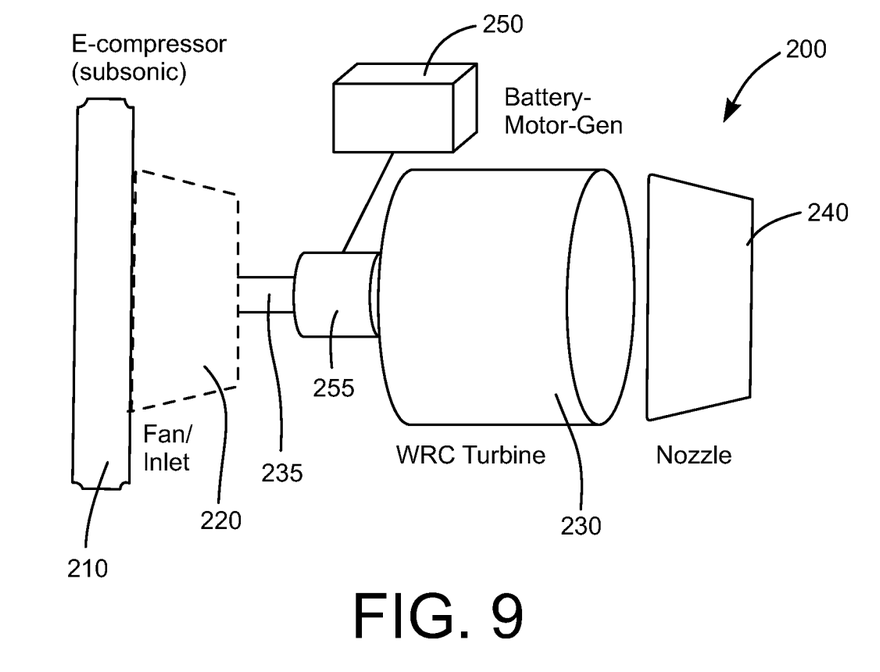
FIG. 9 is a schematic representation of a power system using a wave rotor assembly of FIGS. 1-6, according to one embodiment.

In a further aspect of the present disclosure, a power system 200 shown in FIG. 9 incorporates a wave rotor system 230, which can be configured as the wave rotor systems 20, 20' and 100 described above. The system further includes a fan 210 and a nozzle 240, similar to the engine 10 of FIG. 1 and may optionally include a low-pressure subsonic compressor 220. The wave rotor assembly 230 includes a rotor shaft 235 to drive the fan 210 and/or subsonic compressor 220 as well as components driven by the system 200. In one feature of the system, an electrical motor-generator element 250 is coupled to the rotor shaft 235 to alternatively drive and be driven by the shaft. The element 250 includes a battery for storing electrical energy to drive the motor. The battery may be electrochemical, electrostatic, fuel cell or other energy storage that is convertible to electricity. The generator is operable to charge the battery when driven by the wave rotor assembly 230.

The motor-generator element 250 can be coupled to the rotor shaft 235 by way of a clutch assembly 255 that can connect or disconnect the element from the rotor shaft. In one embodiment, the clutch may be configured to transmit torque between the element 250 and the rotor shaft 235 to accommodate a change in direction of the torque under certain operating conditions. In particular, the direction of the torque changes depending upon whether the fan 220 requires more or less power than the wave rotor 230 can provide. The clutch would thus operate either to charge or discharge the energy storage, or the entire arrangement may incorporate circuitry to disengage the motor-generator element to allow the rotor shaft to spin freely. The clutch assembly 255 may also be configured so that the motor-generator element 250 is coupled to the rotor shaft 235 in one rotational direction for the rotor shaft to drive the generator of the motor-generator element, and in the opposite rotational direction for the motor of the motor-generator element to drive the rotor shaft. The clutch 255 can be of known configurations to either simply couple/decouple and/or change the rotational direction of the coupling.

The element 250 can incorporate a control system that controls the clutch and the operation of the motor and generator. The control system can provide several modes of operation for the system 200. For instance, in one mode of operation the wave rotor assembly 230 is disconnected from the motor-generator element 250 so that the entire power output for the system is supplied to a driven component, such as a propulsion system for an air vehicle. In another mode, the element 250 is coupled to the rotor shaft 235 to drive the generator to charge the battery of the element. In this mode the entire output of the wave rotor assembly can be fed to the generator of the element 250 or the power output can be split between the generator and a driven component, such as the propulsion system mentioned above. In yet another mode of operation, the motor of the motor-generator element 250 runs off the battery and provides power to the rotor shaft 235. This power may be used to initially rotate the wave rotor as well as to augment the power output of the wave rotor assembly when it is fully operational. For instance, the electrical motor may be used to provide an immediate short power boost to the propulsion system.

Thus, in the embodiment of FIG. 9 the propulsive fan and a low-speed compressor are driven by the WRC turbine in parallel with an electric motor powered by stored battery power. The output of the WRC turbine 230 and the electric motor 250 can be individually controlled to provide the total thrust needed in the propulsive fan as well as the compression needed in the WRC. The speed of the WRC turbine will be matched to the fan and compressor, or relatively low gear-ratio will be used for matching the WRC turbine speed to the desired fan speed. The air flow for the WRC turbine may come from compressor 220 which may be driven mainly or solely by the electric motor to raise the overall pressure ratio of the thermodynamic cycle under certain operating conditions. Under some operating conditions, the motor may act as a generator and recharge the electric battery, using power from the WRC turbine. The physical arrangement of the different components may be different from the figure, which is intended to show the mechanical and electrical coupling and gas flows between components. Other versions of this embodiment include:

a. A WRC turbine that drives a fan propulsor, with or without gearing, being supercharged by an air compressor driven an electric motor powered by battery charge.

b. A WRC turbine that drives a fan propulsor and a low speed air compressor to supercharge itself, with or without gearing.

c. A WRC turbine that drives a fan propulsor and an air compressor that is driven by both an electric motor and by the WRC turbine, with or without gearing.

d. A WRC turbine that drives a fan propulsor, being supercharged by an air compressor driven by a conventional turbine supplied with high pressure gas from the WRC turbine.

In simulations, the hybrid system 250 of FIG. 9 was compared to the Boeing SUGAR described above. In particular fuel-burn rates were compared for a B737-class aircraft powered by the SUGAR-volt hybrid electric-gas turbine engine and by the hybrid wave rotor engine arrangement depicted in FIG. 9. Simplified climb-acceleration and cruise calculations were achieved by using a fixed ratio of fuel and electric source thrust in each stage. Descent was assumed to be energy neutral with regeneration offsetting maneuver needs. In these simulations, the hybrid wave rotor engine of the present disclosure yielded about 25% lower fuel burn rate than the SUGAR-volt engine.

Figure 10:
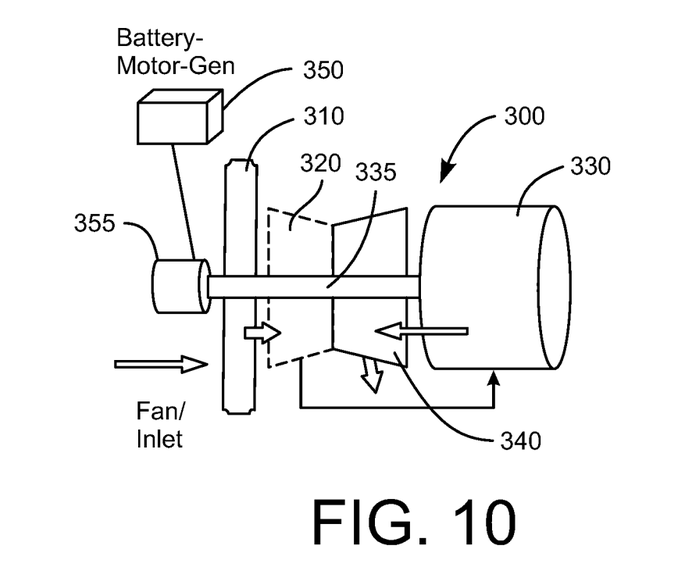
FIG. 10 is schematic representation of another power system using a wave rotor assembly of FIGS. 1-6, according to a further embodiment.

In another embodiment a power system 300 shown in FIG. 10 includes a propulsive fan 310 driven by a WRC turbine 330 via the rotor shaft 335 in parallel with an electric motor 350, via a clutch 355, which is powered by stored battery power. The output of the WRC turbine 330 and the electric motor 350 can be individually controlled to provide the total thrust needed in the propulsive fan. The speed of the WRC turbine will be matched to the fan, or a relatively low gear-ratio may be used for matching the WRC turbine speed to the desired fan speed. The air flow for the WRC turbine 330 may come from a typical compressor 320, driven by a typical turbine 340, with the turbine receiving hot expanded gas from the WRC turbine. Optionally, there may be a low speed compressor that is driven by the WRC turbine or by the electric motor to raise the overall pressure ratio of the thermodynamic cycle under certain operating conditions. Optionally, no conventional turbine is used, allowing the WRC turbine to operate without the turbine inlet temperature constraints. The physical arrangement of the different components may be different from the figure, which is intended to show the mechanical and electrical coupling and gas flows between components. Versions of this embodiment may include:

a. A WRC turbine that drives a fan propulsor, with or without gearing. The fan may be a supersonic through-flow bypass fan, in the case of supersonic flight application.

b. A WRC turbine that drives a fan propulsor, with or without gearing, with the electric motor providing power to the fan under high-power operating conditions.

c. A WRC turbine that drives a fan propulsor, with or without gearing, with the electric motor providing power to the fan under high-power operating conditions. The motor operates as a generator when power needs are lower, and allows the WRC turbine to thus recharge the battery.

d. A WRC turbine that drives a fan propulsor, with or without gearing, only at high power requirements, such as takeoff, with the electric motor providing cruise power drive to the fan.

e. A WRC turbine that drives a fan propulsor, with or without gearing, with a conventional spool that includes one or more compressor stages and one or more turbine stages. The air flow (blue arrows) and hot gas flow (red arrows) would be as shown in FIG. 4.

It can be appreciated that the systems 200 of FIG. 9 or 300 of FIG. 10 are well-suited for a propulsion system which combines two energy sources—combustion and electrical. Augmenting the power output of the wave rotor assembly 230 with electrical power reduces the fuel requirements for the combustion part of the system. Utilizing the combustion power source to charge the electrical energy side of the system allows the use of a much smaller electrical storage device or battery, since the battery can be recharged on-demand.

As discussed above, the wave rotor assembly 230 provides a significant improvement in power output and SFC relative to the conventional gas turbine engine. Thus, while siphoning power from the conventional turbine engine to run an on-board generator is problematic, the wave rotor assembly generates "power to spare" so that power can be diverted away from the driven component or propulsion system to the motor-generator element 250 without significantly impacting the performance of the driven component.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A power system comprising:
a wave rotor combustion engine including an inlet, a pressure gain combustor turbine having a turbine shaft, a rotor, a fan at said inlet coupled to and driven by the turbine shaft, and an exhaust outlet, the rotor including circumferentially spaced vanes each having a first end and a second end defining a width of the vane along a longitudinal axis of the turbine shaft, wherein the circumferentially spaced vanes are curved between the first end and the second end;
a motor-generator element coupled to the turbine shaft, said motor-generator element including an electric motor, a rechargeable battery providing electrical energy to the motor and a generator for recharging the battery; and
a control system for selectively operating the wave rotor combustion engine to drive the generator and for selectively operating the motor powered by the battery to provide rotational energy to the turbine shaft in parallel with or in lieu of rotational energy generated by the wave rotor combustion engine, wherein a gear-ratio between the rotor and the fan results in the fan rotating at a speed that is substantially the same as a speed of the rotor.

2. The power system of claim 1, wherein:
said motor-generator element is coupled to the turbine shaft between the fan and the turbine.

3. The power system of claim 1, wherein said wave rotor combustion engine includes a nozzle at said outlet for producing propulsion power from operation of said engine.

4. The power system of claim 1, wherein the axis of rotation of the rotor and the longitudinal axis of the turbine shaft are co-linear.

5. The power system of claim 1, wherein the wave rotor combustion engine further includes:
a housing defining at least one inlet port and at least one exhaust port;
the rotor rotatably mounted within the housing and comprising a plurality of combustion chambers, the chambers each having an inlet end for gaseous communication with the at least one inlet port and an outlet end for gaseous communication with the at least one exhaust port, each of said chambers defined by the circumferentially spaced vanes between said inlet end and said outlet end; and
at least one igniter disposed within the housing for igniting a combustible material within the combustion chambers.

6. The power system of claim 5, wherein the vanes are curved from the inlet end of the chambers to the outlet end of the chambers.

7. The power system of claim 6, wherein the vanes are parabolic.

8. The power system of claim 6, wherein the vanes have an inlet angle at the inlet end relative to the rotational axis and an outlet angle at the outlet end relative to the rotational axis, the inlet angle having a range of −30 degrees to +30 degrees.

9. The power system of claim 8, wherein the outlet angle has a range of −20 degrees to −60 degrees.

10. The power system of claim 6, wherein the vanes have an inlet angle at the inlet end relative to the rotational axis and an outlet angle at the outlet end relative to the rotational axis, the inlet angle having a range of +20 degrees to +30 degrees.

11. A power system comprising:
a wave rotor combustion engine including an inlet, a pressure gain combustor turbine having a turbine shaft, a rotor, and an exhaust outlet; and
auxiliary components coupled directly to said turbine shaft without a gearbox to drive the auxiliary components at substantially the same rotational speed of said turbine shaft during operation of the wave rotor combustion engine.

12. The power system of claim 11, wherein the wave rotor combustion engine further includes:
a housing defining at least one inlet port and at least one exhaust port; and
at least one igniter disposed within the housing, wherein the rotor comprises a plurality of combustion chambers, the chambers each having an inlet end for gaseous communication with the at least one inlet port and an outlet end for gaseous communication with the at least one exhaust port, each of said chambers defined by circumferentially spaced curved vanes between said inlet end and said outlet end and the at least one igniter is configured for igniting a combustible material within the combustion chambers.

13. The power system of claim 12, wherein the vanes have an inlet angle at the inlet end relative to the rotational axis and an outlet angle at the outlet end relative to the rotational axis, the inlet angle having a range of −30 degrees to +30 degrees.

14. The power system of claim 13, wherein the outlet angle has a range of −20 degrees to −60 degrees.

15. A wave rotor combustion engine comprising:
a housing defining at least one inlet port and at least one exhaust port;
a rotor rotatably mounted within the housing, the rotor comprising a plurality of combustion chambers, the chambers each having an inlet end for gaseous communication with the at least one inlet port and an outlet end for gaseous communication with the at least one exhaust port, each of said chambers defined by circumferentially spaced arcuate vanes between said inlet end and said outlet end, the circumferentially spaced arcuate vanes having a first end and a second end defining a width along a rotational axis of the rotor, wherein the vanes are arcuate in a direction parallel to the rotational axis of the rotor between the first end and the second end; and
at least one igniter disposed within the housing for igniting a combustible material within the combustion chambers.

16. The wave rotor combustion engine of claim 15, wherein said curved vanes are parabolic and have a radius of curvature at said inlet end that is less than the radius of curvature at said outlet end.

17. The power system of claim 16, wherein the vanes are parabolic.

18. The power system of claim 16, wherein the vanes have an inlet angle at the inlet end relative to the rotational axis and an outlet angle at the outlet end relative to the rotational axis, the inlet angle having a range of −30 degrees to +30 degrees.

19. The power system of claim 18, wherein the outlet angle has a range of −20 degrees to −60 degrees.

* * * * *